United States Patent [19]
Aubourg et al.

[11] Patent Number: 5,775,295
[45] Date of Patent: Jul. 7, 1998

[54] PROCESS FOR CONTROLLING A DIRECT-INJECTION INTERNAL COMBUSTION ENGINE

[75] Inventors: Alain Michel-Jean Aubourg, St. Jean; Jean Cosault, Muret, both of France

[73] Assignee: Siemens Automotive S.A., Toulouse Cedex, France

[21] Appl. No.: 809,659

[22] PCT Filed: Sep. 8, 1995

[86] PCT No.: PCT/EP95/03544

§ 371 Date: Mar. 12, 1997

§ 102(e) Date: Mar. 12, 1997

[87] PCT Pub. No.: WO96/08645

PCT Pub. Date: Mar. 21, 1996

[51] Int. Cl.$^6$ ............................. F02D 43/00; F02D 41/02
[52] U.S. Cl. .............................. 123/399; 123/486
[58] Field of Search ........................ 123/73 C, 305, 123/361, 399, 478, 480, 486, 488

[56] References Cited

U.S. PATENT DOCUMENTS

| | | | |
|---|---|---|---|
| 4,760,825 | 8/1988 | Morita | 123/340 |
| 4,799,467 | 1/1989 | Ishikawa et al. | 123/399 |
| 5,349,932 | 9/1994 | Boverie et al. | 123/399 |
| 5,526,787 | 6/1996 | Pallett | 123/399 |

FOREIGN PATENT DOCUMENTS

| | | |
|---|---|---|
| 0450787 | 10/1991 | European Pat. Off. . |
| 0547649 | 6/1993 | European Pat. Off. . |
| 2657398 | 7/1991 | France . |

*Primary Examiner*—Tony M. Argenbright
*Attorney, Agent, or Firm*—Herbert L. Lerner; Laurence A. Greenberg

[57] ABSTRACT

A method for controlling a direct injection internal combustion engine by measuring both the degree of actuation of an accelerator pedal and the engine speed to provide optimal engine tuning parameters. According to the method, a table showing the pressure/air temperature ratio in the intake manifold is established, during engine tune-up, for each degree of actuation/speed pair. The pressure and temperature of the intake air are measured during normal operation, and the measured pressure/temperature ratio is formed. The opening angle of a throttle in the intake manifold is adjusted to make the ratio dependent on a set value read out of the table. Reverse reading of the table is performed to determine a virtual degree of accelerator pedal actuation on the basis of the measured speed and ratio, thereby providing at least one of the optimal engine tuning parameters.

6 Claims, 2 Drawing Sheets

PROCESS FOR CONTROLLING A DIRECT-INJECTION INTERNAL COMBUSTION ENGINE

BACKGROUND OF THE INVENTION

1. Field of the Invention

The present invention relates to a process for controlling an internal combustion engine, particularly suited to a two- or four-stroke direct-injection engine.

2. Description of the Preferred Art

A process for controlling a direct-injection, spark-ignition engine is known from the prior art, for example from French patent application FR 2,657,398, wherein the degree of depression of the accelerator pedal and the speed of the engine are detected so that parameters for the optimal adjustment of the engine may be drawn from them, which parameters include, among other things, the duration of the fuel injection phase as well as the angle of opening of a motorized intake valve. This type of control offers numerous of advantages, but is very sensitive to the selection of adjustment parameters as well as to their potential deviation due to changes in the characteristics of the components of the system over time. For example, the permeability of the air intake assembly (filter, valve, pipes, etc.) can vary over time or from one engine to the next. This can cause a variation in the air supply, and thus in the combustion richness, and can result in an increase in pollution. In order to prevent this, the Applicant has proposed a process and a device for adjusting this combustion richness using a probe for measuring the richness of the exhaust gasses. However, in addition to the added cost of this probe, other drawbacks due to transient phenomena can subsist. In effect, with a rapid action of the accelerator pedal, the computer transmits the corresponding commands to the actuators instantaneously. However, these commands, as well as the phenomena they control, do not all have the same response time. For example, the injectors and the quantity of fuel they deliver occur ahead of the opening of the intake valve. This offset is further accentuated by the lag in the air supply due to the capacity of the intake manifold. Because of this, the richness obtained can deviate from the optimum richness can occur and can generate the emission of pollutants.

Therefore, the object of the present invention is to eliminate these drawbacks of the systems of the prior art by taking into account changes in the air supply, without relinquishing the advantages offered by these systems in the control of direct-injection engines.

SUMMARY OF THE INVENTION

These objects of the invention, as well as others which will become apparent later in the present description, are achieved by means of a process for controlling a direct-injection internal combustion engine of the type which uses a measurement of the degree of depression of the accelerator pedal and a measurement of the rotation speed of the engine to supply parameters for the optimal adjustment of this engine, according to which a table is established during the initial adjustment of the engine, which table represents for each combination (degree of depression, speed), the prevailing pressure/temperature ratio of the air in the intake manifold under stabilized operation; the pressure and the temperature of the intake air are measured under normal operation; the measured pressure/temperature ratio is calculated; and the table and at least one of the measurements taken is used to deduce at least one of the parameters for the optimal adjustment of the engine.

According to a first mode of execution of the process, a set point value for the pressure/temperature ratio of the intake air is determined in the table from the speed and the degree of depression measured, and the angle of opening of a throttle valve placed in the intake manifold is adjusted so as to bring the measured pressure/temperature ratio to this set point value.

According to a second mode of execution of the process, by means of an inverse reading of the table, a virtual degree of depression of the accelerator pedal is determined from the speed and the pressure/temperature ratio measured, and this virtual degree of depression is used to supply at least one of the parameters for the optimal adjustment of the engine.

According to an important characteristic of this mode of execution, the reading of the virtual degree of depression of the pedal in the table is carried out by determining, for the speeds tabulated immediately adjacent to the actual speed, the value of the degree of the depression of the pedal which corresponds to the measured pressure/temperature ratio, and by interpolating these values as a function of the actual speed. Moreover, when several virtual degrees of depression correspond to the measured pressure/temperature ratio, only the virtual degree of depression nearest the actual degree of depression of the pedal is taken into consideration. Likewise, when for a speed tabulated immediately adjacent to the actual speed, the variation in the pressure/temperature ratio recorded in the table in an interval between two values of the degree of depression of the pedal framing the value of the measured ratio is below a predetermined threshold, the virtual degree of depression is determined by choosing the actual degree of depression if it is between the two values of the degree of depression which limit the interval or the nearest limit value if the opposite is true.

Other characteristics and advantages of the invention will become apparent through a reading of the following description and a study of the appended drawings, in which.

Figure 1:
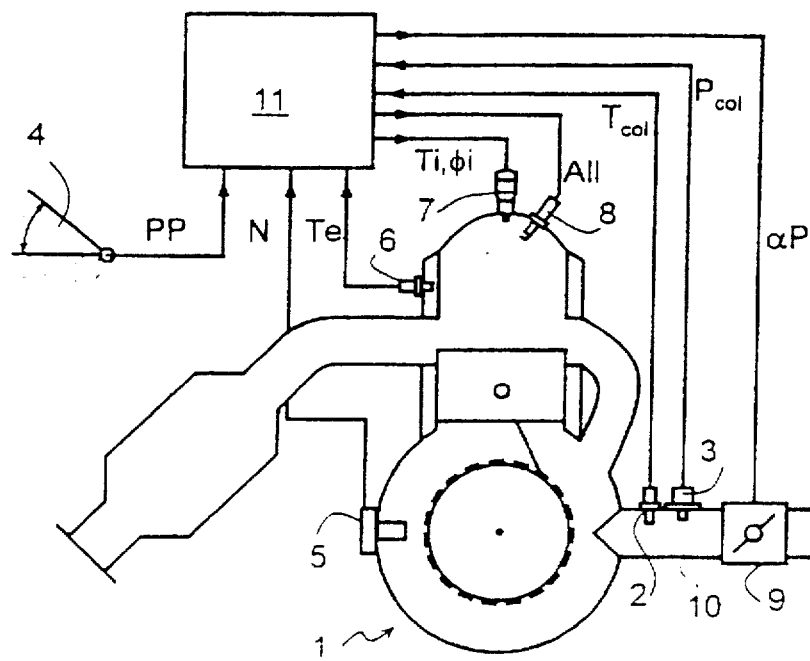
FIG. 1 represents a diagram of an engine equipped with a device suited to the use of the control process according to the invention.

See FIG. 1, which represents a direct-injection internal combustion engine 1 equipped with a computer 11 which controls the operation of the engine. The intake manifold 10 of the engine includes a motorized intake valve 9 which makes it possible to adjust the quantity of air admitted into the engine. An air temperature sensor 2 and a pressure sensor 3, placed between the engine and the motorized valve 9 respectively supply the computer 11 with signals $T_{col}$ and $P_{col}$ which represent the temperature and the pressure of the intake air in the manifold 10 downstream from the valve. The computer 11 also receives a signal PP representing the depression of an accelerator pedal 4, a signal N representing the engine speed delivered by a speed sensor 5, and a signal Te representing the temperature of the coolant delivered by a sensor 6. The computer 11 generates control signals on the basis of these signals and as a function of programmed strategies. In particular, the computer sends to fuel supply means, for example an injector 7, a signal representing the quantity of fuel to be injected into the engine, which signal defines, for example, the phase φ and the duration Ti of the fuel injection. The computer also controls the motorized intake valve 9 placed in the intake manifold 10 by means of a signal which defines an angle αP of opening of the valve, and ignition means 8 by means of a signal AII.

Figure 2:
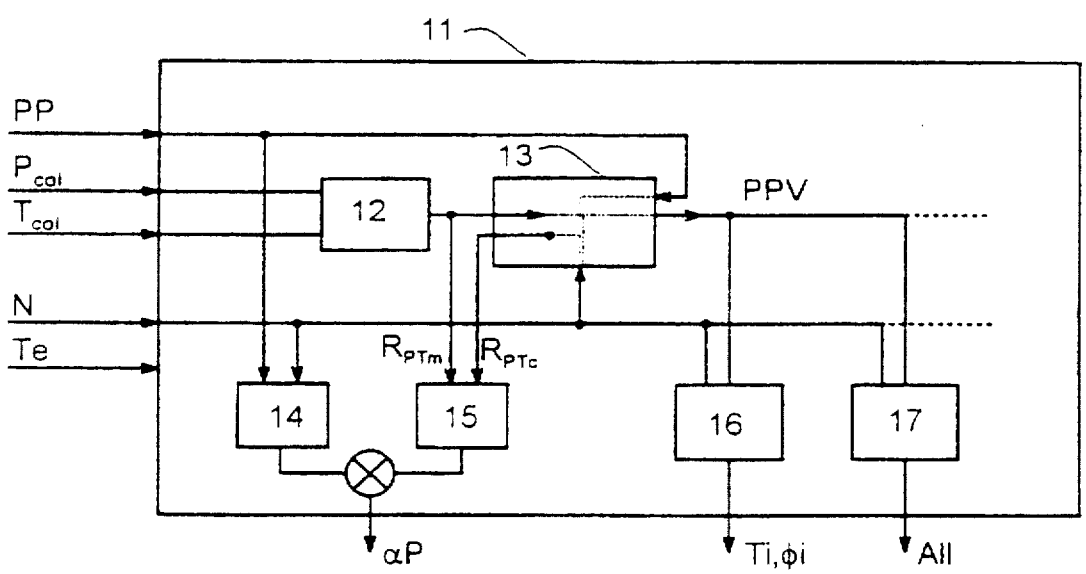
FIG. 2 represents a diagram of the functional architecture of a computer which is part of the device in FIG. 1.

The operation of the device will now be described in detail in connection with FIG. 2, which represents the functional architecture of the computer 11. Classically, during the initial adjustment of the engine, tables are generated which provide the optimal values of engine control parameters such as the angle of opening of the valve αP, the duration Ti and the phase φi of the fuel injection, and the moment of ignition, as a function of the degree of depression PP of the accelerator pedal and the speed N. These optimal values are obtained in stabilized operation, that is, for constant values of PP and N, by adjusting the control parameters so as to obtain, for example, the best engine torque/pollution compromise. According to a teaching of the invention, the prevailing temperature $T_{col}$ and pressure $P_{col}$ of the air in the intake manifold are also measured when these optimal values are applied to the engine and a table of the pressure/temperature ratios $R_{PTO}$ is constructed as a function of the degree of depression PP of the accelerator pedal and the speed N. The computer 11 comprises a unit 12 which receives the signals $T_{col}$ and $P_{col}$ representing the prevailing temperature and pressure of the air in the intake manifold 10 and which can calculate the measured pressure/temperature ratio $R_{PTm}$. The computer 11 also includes a unit 13 which includes a table of pressure/temperature ratios established as described above. The computer also includes units 14 and 15 which are used to determine the angle αP of opening of the valve 9, whose operation will be described in connection with a first operating mode of the process according to the invention, and units 16 and 17 which respectively supply the optimal fuel injection and ignition parameters, whose operation will be described in connection with a second operating mode of the process according to the invention. In normal operation, the computer 11 receives the signals PP, N, $T_{col}$ and $P_{col}$ which respectively represent the degree of depression of the pedal, the engine speed, and the temperature and pressure of the air in the intake manifold.

According to a first operating mode of the invention, the degree of depression of the pedal PP and the speed N are transmitted to the unit 14, which generates a nominal value of the opening of the valve 9 by means of the table constructed during the initial adjustment. These same signals PP and N are transmitted to the unit 13 which, by reading the ratios $R_{PTO}$ directly from the table which contains them, supplies the unit 15 with a set point value $R_{PTc}$ which corresponds to the value of the prevailing pressure/temperature ratio of the air in the intake manifold, under the same conditions during testing. The unit 15 simultaneously receives a value $R_{PTm}$ of the measured pressure/temperature ratio of the air in the intake manifold, generated by the unit 12 on the basis of the signals $T_{col}$ and $P_{col}$ supplied by the sensors 2 and 3. The unit 15 behaves like a standard controller, for example of the P.I.D. type, and emits a correction of the angle of opening of the valve, which is added to the nominal opening value delivered by the unit 14 so as to form the command αP for opening the intake valve 9. This results in a control which tends to correct the nominal value of the opening of the valve determined under the experimental conditions of the initial adjustment so as to take into account variations in the air supply due to variations in the permeability of the intake assembly between engines, to differences between experimental and actual conditions, and to the aging of the system.

The generation of the other engine control parameters is executed according to a second operating mode of the process of the invention. Only the determination of the injection duration Ti in connection with the operation of the unit 16 will be described. In effect, the determination of the other parameters is carried out in a strictly analogous way, such as for example the control of the ignition advance AII by means of the unit 17 or the control of other parameters not mentioned, such as the control of the exhaust back pressure or the flow of lubricating oil in a two-stroke engine by other appropriate units not represented, which could be connected in parallel with the units 16 and 17 as shown by the dotted lines in FIG. 2

As seen previously, the computer 11, receives the signals PP, N, $T_{col}$ and $P_{col}$ which respectively represent the degree of depression of the pedal, the engine speed, and the temperature and pressure of the air in the intake manifold. From these last two signals, the unit 12 generates the measured pressure/temperature ratio $R_{PTm}$, which is transmitted to the unit 13. The unit 13 also receives the engine speed N. The unit 13 then performs an "inverse" reading of the pressure/temperature ratios from the table which contains them and determines from the signals $R_{PTm}$ and N a virtual degree of depression PPV of the accelerator pedal corresponding to the degree of depression which, during the initial adjustment of the engine, made it possible to obtain a pressure/temperature ratio equal to $R_{PTm}$ at the speed N measured. Naturally, taking into account the differences between actual and experimental conditions and the response times previously referred to, the virtual degree of depression PPV thus determined does not necessarily correspond to the actual degree of depression PP. Thus, for example during an abrupt acceleration, the lag in the air supply due to the capacity of the intake manifold causes a lag in the virtual degree of depression PPV relative to the measured degree of depression PP. The virtual degree of depression PPV thus determined is transmitted, along with the speed N, to the unit 16 for defining the injection duration Ti. This unit contains the table of the optimal values for the control of the injection duration constructed during the initial adjustment, and it extracts the command Ti as a function of the virtual degree of depression PPV of the pedal and the speed N. It is noted that this results in an adjustment of an engine control parameter which follows the changes in its air supply as closely as possible, thus allowing optimal operation of the engine during transient phenomena and a consequent reduction in pollution.

Figure 3:
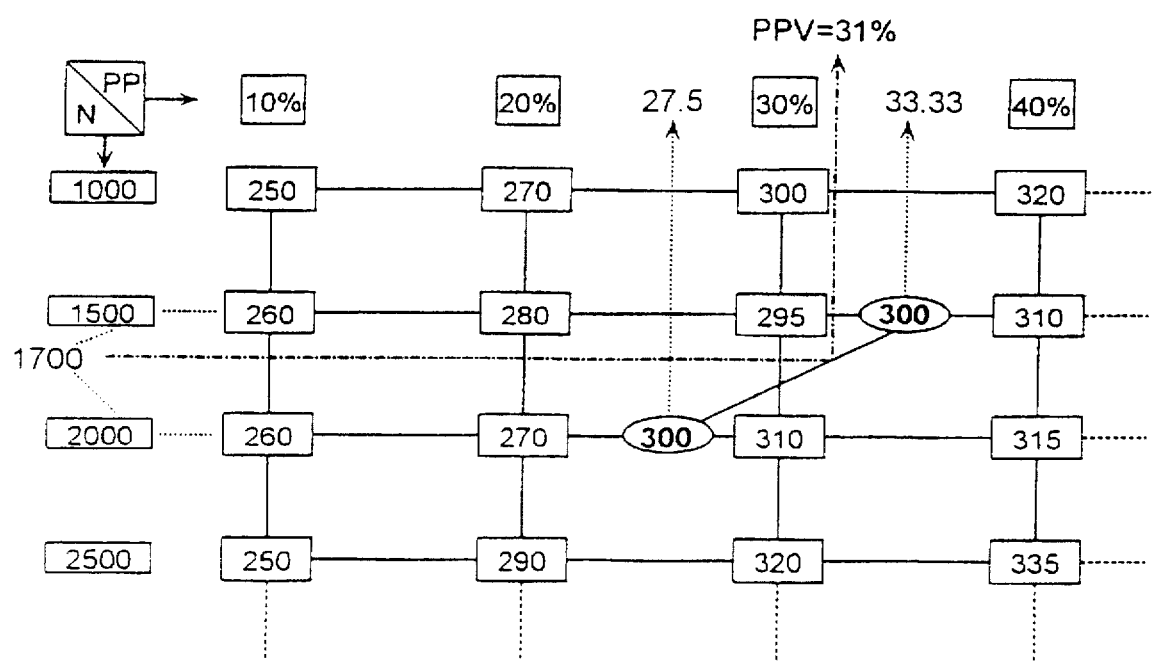
FIG. 3 represents a diagram which is useful to an understanding of one step in the process according to the invention.

The process for the "inverse" reading of the table in unit 13 will now be described in connection with the diagram in FIG. 3, which illustrates this process with an example. FIG. 3 shows a fragment of the table contained in the unit 13, which ranges from 1000 to 2500 rpm in terms of speed (columns) and from 10% to 40% of the maximum degree of depression of the accelerator pedal (rows). The values of the pressure/temperature ratio which appear in the table are expressed in pascal per kelvin. The example illustrated corresponds to the case in which, for a speed N=1700 rpm, a pressure $P_{col}$=90.000 Pa and a temperature $T_{col}$=300° K were measured. The unit 12 therefore supplies a pressure/temperature ratio $R_{PTm}$=300. First, the speeds tabulated immediately adjacent to the actual speed measured at 1700 rpm, that is the rows which correspond to the speeds 1500 rpm and 2000 rpm, are determined. Then, in each of these rows, the value of the degree of depression of the pedal which corresponds to the measured pressure/temperature ratio $R_{PTm}$=300 is sought by performing an interpolation between the two values in the row which frame this ratio, if necessary. In the example, for 1500 rpm, a pressure/temperature ratio $R_{PTm}$=300 corresponds to a virtual degree of depression of 33.33%. Likewise, for 2000 rpm, a virtual degree of depression of 27.5% is obtained. By interpolating between these values as a function of the actual speed N=1700 rpm, a value of 31% is obtained for the virtual degree of depression PPV which corresponds to the values of the example. It will be noted that this process is valid as long as the change in the pressure/temperature ratio is monotonic for the speeds in the table considered, which is generally the case. However, for certain engines, and/or in certain operating ranges, the ratio can be substantially constant or non-monotonic as a function of the actual degree of depression, which can lead to an indeterminacy. In this case, the value of the actual degree of depression is used to eliminate this indeterminacy. For example, if the change is not monotonic for a speed in the table, several values of the virtual degree of depression can correspond to a given value of the pressure/temperature ratio. In that case, the virtual degree of depression closest to the actual degree of depression of the pedal is used. If the pressure/temperature ratio is substantially constant between two increments of the degree of depression in the table, a slight variation in the measured ratio $R_{PT_m}$ can result in wide variations in the value of PPV, which has unfavorable consequences on the stability of the adjustment. Thus, it is verified whether the actual degree of depression of the pedal is between these two increments. If so, the virtual degree of depression is taken to be equal to the actual degree of depression, and if not, it is taken to be equal to the value of the increment in the table nearest to the actual degree of depression.

It is understood that the two operating modes of the process described above are not mutually exclusive. They can be used jointly or separately to control direct-injection engines. Likewise, the invention is not limited to the control of the parameters described, and depending on the type and the complexity of the engine controlled, numerous other parameters can be processed in this way, for example control of the degassing of a filter intended to capture fumes, etc.

The process according to the invention can also be applied in combination with known corrections such as, for example, the correction of the commands sent (injection duration and phase, ignition control, etc.), as a function of other input parameters such as the temperature of the coolant Te supplied by a sensor 6 or the presence of piston knock.

We claim:

1. A process for controlling a direct-injection internal combustion engine in a motor vehicle, which comprises:

measuring a degree of depression of an accelerator pedal of the motor vehicle, measuring a speed of the internal combustion engine, and supplying parameters for optimal adjustment of the engine;

during an initial adjustment of the engine, establishing a table which represents, for each combination of a degree of depression of the accelerator pedal and the speed of the engine, a prevailing pressure/temperature ratio of air in an intake manifold of the engine under stabilized operation;

during normal operation of the engine, measuring a pressure and a temperature of the intake air, and calculating a measured pressure/temperature ratio therefrom;

adjusting at least one of the parameters for optimal adjustment of the engine in dependence on the table established in the establishing step and on measurements in the measuring step during the normal operation of the engine.

2. The process according to claim 1, which further comprises:

defining a setpoint value of the pressure/temperature ratio of the air in the intake manifold from the table in dependence on the speed and the degree of depression of the accelerator pedal; and adjusting an opening angle of a throttle valve in the intake manifold for bringing the measured pressure/temperature ratio to the set-point value.

3. The process according to claim 1, which further comprises:

reading the table in dependence on the measured speed and the measured pressure/temperature ratio, and determining therefrom a virtual degree of depression of the accelerator pedal; and using the virtual degree of depression of the pedal in supplying at least one of the parameters for the optimal adjustment of the engine.

4. The process according to claim 3, wherein the reading step comprises determining, for speeds tabulated in the table immediately adjacent an actual speed, the value of the degree of depression of the accelerator pedal which corresponds to the measured pressure/temperature ratio, and interpolating between these values as a function of the actual speed.

5. The process according to claim 4, which comprises, if more than one virtual degree of depression corresponds to the measured pressure/temperature ratio in the reading step, selecting and taking into consideration only the virtual degree of depression nearest the measured degree of depression of the accelerator pedal.

6. The process according to claim 4, which comprises if, for a speed tabulated immediately adjacent the actual speed, a variation in the pressure/temperature ratio recorded in the table in an interval between two values of the degree of depression of the pedal framing the value of the measured ratio is below a predetermined threshold, then the step of determining the virtual degree of depression comprises:

choosing the actual degree of depression if the actual degree of depression is within the interval, or choosing a nearest limit value if the actual degree of depression is outside the interval.

* * * * *

UNITED STATES PATENT AND TRADEMARK OFFICE
CERTIFICATE OF CORRECTION

PATENT NO. : 5,775,295
DATED : July 7, 1998
INVENTOR(S) : Alain-Michel-Jean Aubourg, Jean Cosault It is certified that error appears in the above-identified patent and that said Letters Patent is hereby corrected as shown below:

On the title page,
Item [30] should read as follows:

Sept. 12, 1994    [FR]    France ......94 10947

Signed and Sealed this

Fifteenth Day of September, 1998

Attest:

BRUCE LEHMAN

Attesting Officer    Commissioner of Patents and Trademarks